D. E. MIDDLETON.
Apparatus for Holding Horses.
No. 225,715. Patented Mar. 23, 1880.
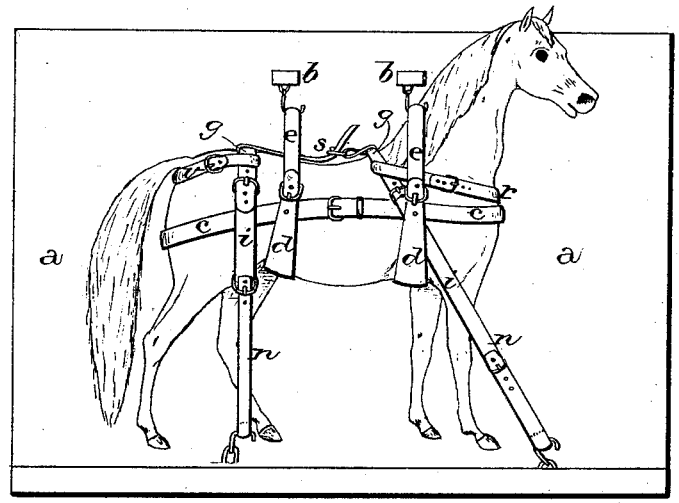
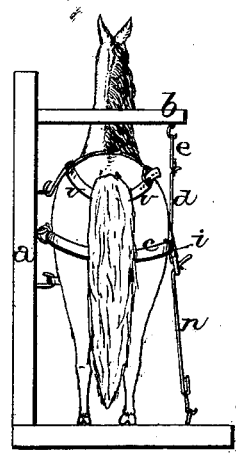

UNITED STATES PATENT OFFICE.

DANIEL E. MIDDLETON, OF PIPER CITY, ILLINOIS.

APPARATUS FOR HOLDING HORSES.

SPECIFICATION forming part of Letters Patent No. 225,715, dated March 23, 1880.

Application filed January 28, 1880.

*To all whom it may concern:*

Be it known that I, DANIEL ELLIS MIDDLETON, of Piper City, in the county of Ford and State of Illinois, have invented certain new and useful Improvements in Devices for Fastening Horses while Shoeing; and I do hereby declare the following to be a full, clear, and exact description of the invention, such as will enable others skilled in the art to which it pertains to make and use it, reference being had to the accompanying drawings, which form part of this specification.

My invention relates to an improvement in apparatus for holding horses while they are being shod; and it consists in a harness, which will be more fully described hereinafter, whereby the horse is fastened to timbers that project out from the wall above him and to the floor, so as to prevent him from rearing up, going forward or backward, or kicking while being shod.

The object of my invention is to provide a cheap and simple rig, which can be readily applied to any horse, and which will hold the most vicious animal perfectly quiet while the shoes are being applied.

Figure 1 is a side elevation of my invention. Fig. 2 is an end view of the same.

$a$ represents the side of the blacksmith's shop or any suitable wall, and from which there project the two short timbers $b$, which reach just over the top of the horse's back. Fastened to two hooks which project out from the wall are the two strong straps $c$, which pass horizontally around the breast and hind quarters of the horse, and which have their free ends buckled together on the side of the horse, as shown. These straps can be drawn with any desired degree of tightness, and hold the horse so that he can neither go forward nor back, and so that he cannot kick with any degree of force. Also hooked to the wall are the two straps $d$, which pass under the horse and up along his side, and which straps are buckled to the straps $e$, which are hooked to the under side of the timbers $b$. By tightening these straps the horse is raised upward to such a degree that he can make little or no resistance. Also fastened to hooks in the wall are the two straps $g$, which pass over the horse's withers and rump, and which straps are buckled to the straps $i$, which support the straps $c$ in position. To the lower ends of the straps $i$ are buckled the straps $n$, which are hooked to the floor. These straps $g$ $i$ $n$ prevent the horse from rising upward either in front or behind. Passing around the horse's neck is the strap $r$, which has both of its ends fastened to the front strap $g$. From the front strap $g$ leads the back-band $s$, which has its rear end fastened to the rear strap $g$, and from this rear strap passes the tail-band $u$. These straps or bands $r$ $s$ assist in preventing the horse from moving the upper part of the body forward or back.

This apparatus is especially useful in shoeing vicious horses and in accustoming young horses to being shod. After a horse has been fastened up a few times in this apparatus he learns that he is perfectly powerless to resist and that he is not going to be hurt, and so becomes perfectly quiet while being shod.

Having thus described my invention, I claim—

1. The combination of the two straps $c$, hooked to the wall at one end and fastened together at the side of the horse, with the straps $g$ $i$ $n$, substantially as shown.

2. In an apparatus for holding horses while being shod, the combination of the straps $c$ $d$ $e$ $g$ $i$ $n$ with the two beams $b$ and the hooks for fastening the straps to, all arranged and combined to operate as described.

In testimony that I claim the foregoing I have hereunto set my hand and seal this 20th day of January, 1880.

DANIEL ELLIS MIDDLETON. [L. S.]

Witnesses:
    W. C. JONES,
    R. B. MILLER.